United States Patent [19]

Greinke et al.

[11] Patent Number: 5,582,811
[45] Date of Patent: Dec. 10, 1996

[54] STABLE BLISTER FREE FLEXIBLE GRAPHITE AND METHOD

[75] Inventors: Ronald A. Greinke, Medina; Richard I. Bretz, Parma, both of Ohio

[73] Assignee: UCAR Carbon Technology Corporation, Danbury, Conn.

[21] Appl. No.: 532,365

[22] Filed: Sep. 22, 1995

Related U.S. Application Data

[63] Continuation of Ser. No. 278,988, Jul. 22, 1994, abandoned, which is a continuation of Ser. No. 756,425, Sep. 9, 1991, abandoned, which is a continuation-in-part of Ser. No. 633,411, Dec. 21, 1990, abandoned.

[51] Int. Cl.$^6$ .................................................. C01B 31/04
[52] U.S. Cl. ..................... 423/265; 423/448; 423/460; 264/31
[58] Field of Search ......................... 423/448, 460, 423/265, 266; 264/31, 42, 43

[56] References Cited

U.S. PATENT DOCUMENTS

| | | | |
|---|---|---|---|
| 3,404,061 | 10/1968 | Shane et al. | 428/143 |
| 3,475,244 | 10/1969 | Sanders | 423/448 |
| 3,885,007 | 5/1975 | Olsen et al. | 423/460 |
| 4,663,144 | 5/1987 | McQuillan et al. | 423/448 |
| 4,752,518 | 6/1988 | Lohrke | 428/131 |
| 4,895,713 | 1/1990 | Greinke et al. | 423/448 |

FOREIGN PATENT DOCUMENTS

| | | |
|---|---|---|
| 2106621 | 9/1971 | Germany . |

*Primary Examiner*—Michael Lewis
*Assistant Examiner*—Stuart L. Hendrickson
*Attorney, Agent, or Firm*—Frederick J. McCarthy

[57] ABSTRACT

A stable blister free flexible graphite is formed in accordance with the present invention by performing two chemical reactions including a first step of high temperature heat treatment which converts the active carbon surface from hydrophilic to hydrophobic and generates active surface sites and a second step of exposing the heat treated graphite to a stabilizing reagent for stabilizing the active sites generated by the first step of high temperature heat treatment.

2 Claims, No Drawings

STABLE BLISTER FREE FLEXIBLE GRAPHITE AND METHOD

This application is a Continuation of prior U.S. application: Ser. No. 08/278,988 7/22/94, and/which is a continuation of application Ser. No. 07/756,425 9/9/91, and/ which is a continuation-in-part of application Ser. No. 07/693,411 12/21/90, now abandoned.

FIELD OF INVENTION

The present invention relates to a stable blister free flexible graphite foil structure and to a method of forming a stable blister free flexible graphite foil structure.

BACKGROUND OF THE INVENTION

The term "flexible graphite" as used herein represents the exfoliated reaction product of rapidly heated graphite particles which have been treated with an agent that intercalates into the crystal structure of the graphite to expand the particles at least 80 or more time in the direction perpendicular to the carbon layers in the crystal structure. Flexible graphite may be compressed into thin sheets (hereinafter referred as "foil") with a density approaching theoretical density, although a density of about 70 lbs/ft$^3$ is acceptable for most applications.

Flexible graphite possesses an appreciable degree of anisoptropy and heat insulating properties and is, accordingly, particularly useful for high temperature applications. However, upon rapid exposure to high temperature, flexible graphite foil may suffer an objectionable surface deformation phenomenon which takes the form of blistering. Blistering occurs on the surface of the flexible graphite foil when diffusion of thermally activated moisture adsorbed into the crystal structure is too slow to release the build up in desorbed gas pressure. This results in the delamination of the carbon layer planes at the surface of the foil causing the foil to blister. One method to minimize or eliminate blistering is to promote venting of the thermally adsorbed moisture by adjusting the physical parameters of the foil. This may be done by puncturing holes in the foil as taught and described in U.S. Pat. No. 4,752,518. Alternatively, one could change the density or thickness of the foil so that it is less dense and/or thinner than standard dimensions. These physical methods are objectionable in that they change the desired physical characteristics of the foil and will affect its heat insulating properties. The thermal environment to which the foil is subjected may also be controlled but this would minimize the utility of the foil.

SUMMARY OF THE INVENTION

In accordance with the present invention, the surface chemistry of the foil is modified so as to preclude or minimize the amount of water adsorbed into the graphite foil. This is accomplished by converting the graphite foil surface to a stable hydrophobic surface which prevents blistering.

Blistering occurs in heated flexible graphite foil if the amount of adsorbed moisture exceeds the threshold level of adsorbed moisture. The blistering threshold level of adsorbed moisture varies from foil to foil and is a function of many physical variables, such as foil thickness, density, the rate of temperature rise from ambient temperature, and the maximum heating temperature. When the amount of moisture evolved from the heated foil is above the threshold level of adsorbed moisture, the foil blisters. Conversely, if the amount of moisture evolved is below the threshold level of adsorbed moisture, the foil will not blister. The amount of water adsorbed on the foil depends upon the foil's surface chemistry and upon environmental conditions, such as the relative humidity.

In accordance with the present invention the surface chemistry of the foil is modified to minimize the amount of water adsorbed. This is accomplished using two chemical reactions for converting the graphite foil surface from an acidic, hydrophilic surface to a basic, stable, hydrophobic surface which prevents blistering. The first chemical reaction is a high temperature heat treatment of at least 600° C., and preferably above 800° C., for a controlled time period for converting acidic hydrophilic surface functional groups (such as carboxylic acids, lactones, hydroxyl, and carbonyl) to a basic, hydrophobic functional group. The heated foil is blister-free for a short time interval of several months until its active sites slowly react in air which restores blistering unless a second chemical reaction is timely applied to stabilize the graphite surface. The second chemical reaction, a stabilizing reaction, involves the addition of a reagent to the active sites on the graphite that were generated by the high temperature heat treatment. The reaction of the active sites with reagents, such as hydrogen, chlorine, hydrochloric acid, nitric acid-hydrochloric acid, or phosphoric acid introduces hydrophobic functional groups and prevents the active sites from reacting slowly in air (a hydrophilic reaction), which prevents the foil from reverting back to a blistering foil in about one to three months.

The active sites behave like unsaturated or olefinic double bonds which react with oxygen and water in the air to form oxirane rings, alcohols and glycols. These functional groups are hydrophilic in nature and, as such, again promote water adsorption and significant gassing. The reaction of the active sites with reagents which result in the addition of hydrophobic functional groups to the graphite surface stabilizes the foil surface and maintains the amount of adsorbed water below the foil's threshold level.

A method of forming a stable blister-free flexible graphite foil structure in accordance with the present invention comprises:

Intercalating particles of graphite flake with an intercalating agent;

exfoliating the intercalated graphite particles to a volume of over 100 cm$^3$/g;

compressing the exfoliated graphite particles into a flexible graphite structure;

heat treating said flexible graphite structure at a temperature of at least 600° C. for a controlled time period of between 30 minutes and 5 seconds based upon said heat treatment temperature; and exposing the heat treated flexible graphite structure to a stabilizing reagent selected from the group consisting of $H_2$, $Cl_2$, $Br_2$, $F_2$, HCl, $HNO_3$—HCl and $H_3PO_4$ with the reagent concentration of $Br_2$, $F_2$, and $H_3PO_4$ selected to result in an elemental bromine, fluorine, and phosphorus concentration in the graphite structure of no more than 600 ppm, 150 ppm and 600 ppm respectively.

The stable blister free flexible graphite foil structure of the present invention comprises an exfoliated mass of graphite particles having a density above about 70 lb/ft$^3$ and a crystal structure containing hydrophobic functional groups of a reagent chemically bonded to its surface with said reagent selected from the group consisting of hydrogen, hydrogen chloride, chlorine, bromine, fluorine, phosphoric acid and hydrogen chloride-nitric acid and in a concentration such that the inclusion of elemental bromine, fluorine and phosphorus in the graphite foil structure is limited to no more than 600 ppm, 150 ppm and 600 ppm respectively.

DETAILED DESCRIPTION OF THE INVENTION

Flexible graphite is made by first treating graphite flakes with agents that intercalate into the crystal structure of the graphite and react to form a compound of graphite and the intercalant. Upon heating at a high temperature, the intercalants in the graphite crystal form a gas, which causes the layers of the graphite to separate, and the graphite flakes to expand or exfoliate in an accordion-like fashion in the c-direction, i.e. the direction perpendicular to the crystalline planes of the graphite. The exfoliated graphite flakes are vermiform in appearance, and are therefore commonly referred to as worms. The worms are then compressed together into sheets. Unlike the original graphite flakes, the sheets are flexible and can be formed and cut into various shapes.

A common method for manufacturing graphite foil from flexible graphite is described by Shane et al. in U.S. Pat. No. 3,404,061 the disclosure of which is incorporated herein by reference. In the typical practice of the Shane et al. method, natural graphite flakes are intercalated by dispersing the flakes in a solution containing an oxidizing agent, such as a mixture of nitric and sulfuric acid. In the method of the present invention a low ash content natural graphite flake is preferred over a high ash content flake. After the flakes are intercalated excess solution is drained from the flakes. The quantity of intercalation solution retained on the flakes after draining is typically greater than 100 parts of solution by weight per 100 parts by weight of graphite flakes (pph) and more typically about 100 to 150 pph.

After washing with water, the intercalated graphite flakes are dried and then exfoliated into flexible graphite by exposing them to a flame for only a second or less at temperatures greater than 700° C., more typically 1000° C. or higher. The exfoliated graphite flakes or worms are then compressed and rolled into a densely compressed graphite foil sheet of desired density and thickness.

Alternatively, the quantity of the intercalation solution can be limited to between 10 to 50 parts of solution per hundred parts of graphite by weight (pph) which permits the washing step to be eliminated as taught and described in copending U.S. patent Ser. No. 4,895,713 the disclosure of which is herein incorporated by reference.

The intercalation solution of the present invention contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In the preferred embodiment of the invention, the solutions are mixtures of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions of the invention may contain metal halides such as ferric chloride, and ferric chloride mixed with sulfuric acid, or a halide, such as bromine as a solution of bromine and sulfuric acid or bromine in an organic solvent.

The intercalated flakes, either dried or undried, may be exfoliated by conventional means, which involves quickly heating the flakes, typically in a flame, up to a temperature greater than 700° C., preferably greater than 1000° C. for a time period of around one second or less. The standard exfoliation time of about one second at elevated temperatures (Bunsen burner flame temperature or higher) is too short to convert acidic hydrophilic surface groups on the graphite to basic hydrophobic groups. Accordingly, the exfoliation step cannot, of itself, serve as the first high temperature chemical reaction heat treatment in accordance with the present invention. The exfoliated graphite may then be compressed into flexible graphite sheet or foil. Suitable exfoliation methods and methods for compressing the exfoliated graphite flakes into thin foils are disclosed in the aforementioned U.S. Pat. No. 3,404,061 to Shane et al. It should be noted that it is conventional to roll and compress the exfoliated worms in stages with the product of the first stage of compression known in the art as "a low density mat". The mat is then compressed into a standard density foil.

A stable blister free flexible graphite foil is prepared in accordance with the present invention by subjecting the graphite particles to two chemical reactions. A flexible graphite foil is considered blister free if no blistering is visually apparent on the surface of the foil after first aging for a substantial number of months, e.g. 12 months, and then subjecting the foil to rapid heating in a Bunsen burner flame (900° C.–950° C.). The two chemical reactions of the present invention can occur separately or simultaneously and can be integrated into the foil fabricating procedure or applied subsequent to the manufacture of the foil. The first chemical reaction is a high temperature heat treatment of either the standard graphite flake, the exfoliated worms, the low density mat or the standard density foil for a controlled time period based upon the heat treatment temperature. When the heat treatment temperature is above 900° C. heat treatment should be from 20 seconds to not less than 5 seconds at the highest temperature whereas when the heat treatment is at 600° C. a minimum time period of between 1–30 minutes is necessary. When the heat treatment is between 600° and 900° C. the heat treatment time is between 30 minutes and 20 seconds respectively. The perferred minimum heat treatment temperature is 800° C. The high temperature heat treatment converts acidic surface functional groups which are hydrophilic to functional groups which are hydrophobic. One would expect high temperature heat treatment of itself to reduce or inhibit blistering in a flexible graphite foil. Although heat treatment under the correct conditions will inhibit blistering it has been proven to be transitory, i.e., after a sufficient time period, which may vary from one to three months, the foil will again be susceptible to blistering. This mechanism can be attributed to the formation of unsaturated active sites caused by the decomposition of acid surface functional groups present on all carbons. Upon cooling, oxygen and water in air react at the unsaturated sites forming functional groups which are hydrophilic. In accordance with the present invention the heat treated flexible graphite is exposed to stabilizing reagents such as hydrogen, hydrogen chloride, chlorine, bromine, fluorine, hydrogen chloride-nitric acid and phosphoric acid. This second reaction prevents blistering by stabilizing the active sites in the graphite surface which minimizes reaction with water and oxygen in air. It is believed that the second reaction causes the attachment of hydrophobic functional groups to the surface of the graphite. The preferred stabilization treatment is hydrogenation or halogenation, preferably chlorination in which hydrogen molecules or molecules of chlorine or bromine are chemically bonded to the graphite surface. The preferred concentration for hydrogen is between 10–30 ppm whereas 150 ppm and up to about 300 ppm is preferred for chlorine. If the stabilization chemical reaction is accomplished by a phosphoric acid treatment, the phosphorus concentration retained in the crystal structure of the foil should preferably be above 200 ppm but not more than 600 ppm. The stabilizing reagent should be added only in a limited quantity sufficient to react with the active sites generated by heat treatment. Excess reagent is unnecessary and for certain reagents such as bromine and fluorine detrimental. Bromine if present in excess of the stoichiometric amount to react with the active sites will be physically adsorbed on the graphite structure and will also intercalate which will cause exfoliation and blistering when heated. Fluorine, if present in excess of the stoichiometric amount to react with the active sites will chemically react with the nonactives sites in the graphite structure. Accordingly, for bromine the concentration of reagents should be limited to result in no more than 150 to 600 ppm bromine in the graphite structure and for fluorine 75 to 150 ppm. With respect to the amounts of stabilizing groups in the graphite structure for other reagents such as hydrogen 10–30 ppm is sufficient, for chlorine 150–300 ppm is sufficient and for phosphorus 200 to 600 ppm is sufficient. An excess of $H_2$, $Cl_2$, $HNO_3$—HCl and HCl reagents is not, of itself, detrimental.

Two circumstances require a second heat treatment in order to produce a stable blister free flexible graphite.

(a) When the first heat treatment and stabilization reaction occurs with the starting graphite flake or (b) When the first heat treatment occurs after exfoliation and the subsequent stabilization reaction involves using an acidic reagent, such as hydrochloric acid-nitric acid.

The purpose of the second heat treatment is to remove from the graphite surface, hydrophilic acid groups introduced either by the intercalant or by the acidic stabilization reagent, without removal of the desired hydrophobic stabilization functional groups, such as those which contain phosphorus or chlorine. Therefore, the second heat treatment should have a temperature limitation which is below the fracturing temperature of the stabilizing functional group but above the temperature required to remove the acid functional groups of above about 600 C. A 900 C heating for 20 seconds is sufficient to achieve these goals. As evident from examples 6, 7 and 12, the phosphorus and chlorine remain in the foil after this second heat treatment. The second heat treatment should go between 600° and about 1000° C. for a controlled time period with a longer hold time required for the 600° C. temperature and a shorter hold time required for the higher 1000° C. temperature.

The following examples are illustrative of the invention. For comparative purposes the intercalating solution was formed using reagent grade sulfuric acid (96% strength) and nitric acid (70% strength). The flexible graphite foil was formed to standard dimensions of 0.015" thick and 70 lb/ft$^3$ density in examples 1 to 7 and 10 to 15 respectively whereas the foil thickness was 0.020" in examples 8 and 9. The prepared samples of flexible graphite were aged in the laboratory at ambient conditions. The "A" designated graphite flakes in the following examples contain less than 1% ash, while the "B" designated flakes contain between 1 and 5% ash and the "C" flakes contain greater than 5% ash. The material in each example was subjected to the "blister-free" test described heretofore to determine its blister-free status.

Example (1) A natural graphite "C" flake was heated in an inert atmosphere at 1700° C. The graphite flakes were then subjected to chlorine gas for one hour. After the treatment, the sample was cooled to room temperature. The flakes were intercalated using 30 pph of an intercalating treat, consisting of 85% $H_2SO_4$ and 15% $HNO_3$ by weight. After exfoliation it was pressed into a mat and subjected to hydrogen gas at 630° C. and cooled to room temperature. The product was then rolled into foil of standard dimensions (0.015" thick and 70 lb/ft$^3$ density). This material after 420 days was tested and shown to be blister-free.

Example (2) A natural graphite "C" flake was heated to 1700° C. in an inert atmosphere. The graphite flakes were then subjected to chlorine gas for one hour. After the treatment, the sample was cooled to room temperature. The flakes were intercalated using 30 pph of an intercalating treat, consisting of 85% $H_2SO_4$ and 15% $HNO_3$ by weight. After exfoliation, the worms were pressed into a mat and heated to 900° C. for 20 seconds and then rolled into foil of standard dimensions as in example (1). This material was tested after 360 days and shown to be blister-free. (This example was similar to Example (1) except it was not subjected to the additional hydrogenation reaction. The sample was reheated to 900° C. after exfoliation since acidic sites introduced during intercalation had to be removed. The resulting flexible graphite had less than 4 ppm of soluble or leachable chloride present.)

Example (3) An "A" flake was intercalated using 30 pph of an intercalating treat composed of 85% sulfuric acid and 15% nitric acid and then exfoliated. The exfoliated product was pressed into a mat and hydrogenated with hydrogen gas at 1000° C. in an inert atmosphere. After cooling to room temperature, the product was rolled into a foil of standard dimensions as in example (1). The foil did not blister after 360 days.

Example (4) Comparative example—An "A" flake was intercalated using 30 pph of an intercalating treat composed of 85% sulfuric acid and 15% nitric acid. The intercalated product was exfoliated, rolled into a low density mat and then heat treated at 900° C. for 20 seconds in a Bunsen burner flame. This initial blister-free material began to blister after only 30 days. (Note that this material was only given one reaction, the heat treatment. The sample upon exposure to air reverted back to a blistering foil.)

Example (5) Comparative example—An "A" flake was intercalated using 25 pph of an intercalating treat composed of 80% sulfuric acid and 20% nitric acid and then exfoliated. After exfoliation, the resulting mat was heat treated at 900° C. for 20 seconds in a Bunsen burner flame. The heated mat was rolled into a foil with standard dimensions. This initial blister-free material began to blister after only 60 days. (Note that this material was given only one reaction, the heat treatment.)

Example (6) A low ash (0.1%) natural graphite flake was heated at 2900° C. by the supplier to purify it. Five ml of an HCl solution (6 ml of 38% HCl diluted to 1000) were added to 25 g of the flake and blended until the slurry was uniform. The slurry was then placed on the hot plate and boiled to dryness. After intercalation using 30 pph of an intercalating treat composed of 85% sulfuric acid and 15% nitric acid by weight, it was exfoliated. After pressing into a mat, it was heat treated in a flame for 20 seconds and rolled into a foil of standard dimensions. The foil did not blister after 360 days. (This sample was subjected to two reactions resulting in a stable blister-free flexible graphite.)

Example (7) Twenty-five grams of "A" graphite flake were placed in a 100 ml porcelain crucible and heated at 900° C. for one minute in a Bunsen burner flame. 7.5 g (30 pph) of an intercalating treat composed of 85% sulfuric acid and 15% nitric acid and 0.09 g of phosphoric acid were added and blended into the flake. After exfoliation, the product was pressed into a mat and heated in a Bunsen burner flame for at least 20 seconds. The mat was then rolled into a foil of standard dimensions. This material did not blister for 360 days. (Note that this flexible graphite sample was subjected to the two reactions, a heat treatment of the flake and a stabilization reaction with phosphoric acid. The final flexible graphite has 365 ppm of phosphorus present.)

Example (8) Comparative example—A low ash (0.1%) natural graphite flake was heated at 2900° C. in order to reduce the ash content. This material was intercalated using 25 pph of an intercalating treat consisting of 80% sulfuric acid and 20% nitric acid This material was dried at 100° C., exfoliated, and the worms were rolled into a 0.020" thick foil with a density of 70 lb/ft$^3$. This material blistered immediately after preparation. (Note that this flexible graphite was heated before the intercalation reaction. Because it was not flame treated after the exfoliation reaction, it blistered immediately.)

Example (9) Comparative example—This flexible graphite was the same as in comparative example (8), except the foil was heat treated in a flame at 900° C. for 20 seconds, and then rerolled to 0.020" thickness. This material did not blister when heated in a bunsen burner flame during the first 30 days, but blistered badly after 90 days. (The flame treatment changed the surface chemistry and resulted in a temporary nonblistering flexible graphite. It blistered again because the sample was not subjected to the second stabilizing reaction, which is a reaction with a reagent, such as chlorine or hydrogen which introduced hydrophobic functional groups chemically bonded to the graphite surface.)

Example (10) Comparative example—A "C" flake was intercalated using an excess of intercalating solution consisting of 92% sulfuric acid and 8% nitric acid. The intercalated product was exfoliated and then rolled into a foil of standard dimension. The foil was then slowly heated in vacuum at 1200° C. This initial blister-free material began to blister after only 90 days. (Note that this material was given one reaction, the heat treatment. It initially prevented the blistering, but the surface was reactive and blistering returned.)

Example (11) An "A" Flake was intercalated using an excess of intercalating solution consisting of 92% sulfuric acid and 8% nitric acid. The washed and dried intercalated product was exfoliated and then rolled into a foil of standard dimension. The foil was slowly heated to 1700° C. and then subjected to chlorine gas. After cooling, this material did not blister after one year. The foil contained 180 ppm of chlorine but less than 5 ppm of leachable chlorine.

Example (12) An "A" flake was intercalated using 30 pph of an intercalating treat consisting of 85% sulfuric acid and 15% nitric acid. After exfoliation the product was pressed into a mat and heat treated in a Bunsen burner flame for 20 seconds. The mat was then soaked in a 20% aqua regia solution composed of 500 ml water, 50 ml HCl, and 50 ml HNO$_3$. The material was washed and dried overnight at 130° C. Then the material was heated in a flame for 20 seconds and then rolled into foil of standard dimension. This material was blister-free after 360 days. (This material was given the second high temperature heat treatment. An aqua regia solution generates chlorine gas, which chlorinated the mat. The treated mat was given the second heat treatment in a Bunsen burner flame for 20 seconds to remove some hydrophilic acid groups generated on the surface by the nitric acid).

Example (13) Comparative example—This was identical to example (12), except it was not given the final heat treatment in the flame after the aqua regia treatment. This material blistered immediately. (This study shows the importance of a final heat treatment after reaction with an acidic stabilizing reagent such hydrochloric acid-nitric acid. The acid introduced hydrophilic groups. In this case, we did not heat treat after aqua regia treatment and the flexible graphite adsorbed water in excess of the blistering threshold limit value.)

Example (14) Comparative example—Fifteen grams of "A" flake were intercalated with 4.5 g (30 pph) of an intercalating treat consisting of 83% sulfuric acid, 14.5% nitric acid and 2.5% phosphoric acid. After exfoliating, the product was pressed into a mat and heated in a Bunsen burner flame for 20 seconds. The mat was then rolled into a flexible graphite foil. This material did not blister when first made, but after 120 days it began to blister badly. (Note that the treatment with phosphoric acid occurred before the heat treatment in the flame. Therefore, the active sites generated during the heat treatment in the flame were not stabilized.)

Example (15) A "B" flake was intercalated using an excess of intercalating solution consisting of 92% sulfuric acid and 8% nitric acid. The intercalated product was washed, dried, exfoliated, and then rolled into foil of standard dimension. The foil was slowly heated to 1700° C. and then subjected to chlorine gas. After cooling, this material did not blister after one year. The foil contained 250 ppm of chlorine and less than 5 ppm of leachable chloride.

We claim:

1. A method of forming a stable blister-free flexible graphite foil structure comprising the steps of:

(a) intercalating particles of graphite with an intercalating agent;

(b) exfoliating the intercalated graphite particles to a specific volume of over 100 cm$^3$/g;

(c) compressing the exfoliated graphite particles into a flexible graphite structure;

(d) heat treating said compressed flexible graphite structure at a temperature of at least 600° C., when the heat treatment temperature is above 900° C. heat treatment is from 20 seconds to not less than 5 seconds at the highest temperature, when the heat treatment is at 600° C. the time period is 1–30 minutes, when the heat treatment is between 600° and 900° C. the heat treatment time is between 30 minutes and 20 seconds; and (e) exposing the compressed flexible graphite structure of step (d) to a stabilizing reagent selected from the group consisting of H$_2$, Cl$_2$, Br$_2$, F$_2$, HCl, HNO$_3$—HCl and H$_3$PO$_4$ with the reagent concentration of Br$_2$, F$_2$, and H$_3$PO$_4$ to provide an elemental bromine, chlorine, fluorine, and phosphorus concentration in the graphite structure of no more than 150 to 600 ppm, 150 to 300 ppm, 75 to 150 ppm, and 200 to 600 ppm, respectively.

2. A method as defined in claim 1 further comprising the step of applying a heat treatment to said graphite particles prior to the intercalation of step (a) for a controlled time period at a temperature of at least 600° C., when the heat treatment temperature is above 900° C. heat treatment is from 20 seconds to not less than 5 seconds at the highest temperature, when the heat treatment is at 600° C. said time period is 1–30 minutes, when the heat treatment is between 600° and 900° C. the heat treatment time is between 30 minutes and 20 seconds.

* * * * *